United States Patent Office

2,831,774
Patented Apr. 22, 1958

2,831,774

PROCESS FOR THE IMPROVEMENT OF COLOR IN MEAT

Henry P. Furgal, Chicago, Ralph F. Kampschmidt, Oak Park, and Peter Arialis, Chicago, Ill., assignors to Armour and Company, Chicago, Ill., a corporation of Illinois No Drawing. Application December 17, 1954
Serial No. 476,078

9 Claims. (Cl. 99—107)

This invention relates to a process for improving the color of meat products. In one of its aspects, this invention relates to a process for improving the surface color of packaged meat products. In another of its aspects, this invention relates to an improved process for speeding the development of color in the production of cooked cured meat products. In yet another of its aspects, this invention relates to a process for retarding the loss of color in vacuum-packaged cooked cured meat products in the presence of light.

The color of meat plays an important part in its salability, for customers generally feel that if a piece of meat has a nice pink color it is fresh and take it in preference to a slightly discolored piece. Actually, meat can be comparatively fresh and still be discolored due to its exposure to oxygen and/or light. The color of meat is generally attributed to the presence therein of oxygen-bearing pigments including myoglobin and hemoglobin, each of which are compounds of ferro- or ferriheme and protein or ferro- or ferriprotoporphyrins. Myglobin is purplish-red in color and when it takes up oxygen it becomes oxymyoglobin, which is bright red. Oxidation of myoglobin produces metmyoglobin, which is greyish-brown in color. Similarly, hemoglobin is purplish-red and on oxygenation becomes oxyhemoglobin which is bright red. Oxidation results in methemoglobin which is greyish-brown.

It is well known that other materials will react with myoglobin and hemoglobin to produce a bright red colored pigment, and this principle is applied in the conventional curing processes and compositions which contain sodium nitrite or a nitrite-producing salt. Conventional curing compositions generally contain salt, sugar, spices, and either a nitrite, a nitrate, or a mixture of nitrite and nitrate. The nitrite decomposes to give nitric oxide which reacts with the myoglobin and hemoglobin to produce nitrosomyoglobin and nitrosohemoglobin which have a bright red color. However, the nitroso-pigments are not a complete answer to the problem of meat color for the reason that they are not stable. They tend to decompose when exposed to light, especially the fluorescent light used in cold storage display cases. They are also affected by the presence of oxygen, as in air.

The difficulty in connection with meat pigments is seen more readily in the case of ground meat. For example, when beef is ground into hamburger, the exterior of the meat is subjected to contact with the oxygen of the air, and the myoglobin of the exterior surface portion is converted to oxymyoglobin which is bright red in color. Another undesirable change which sometimes takes place is the oxidation of the myoglobin to metmyoglobin which is an undesirable greyish-brown color. In the preparation of sausage type meats, such as frankfurters, Bologna, meat loaves, etc., which are chopped or comminuted meat products treated with a nitrite-containing curing composition, the met-pigments must be reduced before the color of the nitroso-pigments is produced. This is generally accomplished by heating, and the red color does not begin to develop until a temperature of about 130° F. is reached. If any pork is contained in the meat product, U. S. government regulations require that it be heated to an internal temperature of 137° F. to destroy any trichina present in the pork. The usual practice is to heat the meat to about 155 to 160° F. to develop uniform color and to insure compliance. This high temperature, however, causes an undesirable change in some of the protein material in the meat which has a later adverse effect upon the color of it. Therefore, it would be desirable if a uniform color could be developed at a lower temperature thus minimizing the undesirable change in the protein and increasing the stability of the red color developed.

It is, therefore, an object of this invention to provide a process for improving the color of meat products.

It is another object of this invention to provide a process for improving the surface color of packaged meat products.

Still another object of this invention is to provide an improved process for speeding the development of color in the production of cooked cured meat products. A further object of this invention is to provide a process for retarding the loss of color in vacuum-packaged cooked cured meat products.

In its broadest aspect, the present invention contemplates improving the color of a meat product by subjecting the meat material therein to contact with a ferrous salt to increase the added ferrous ion concentration thereof from 30 to 300 parts per million. The process has particular applicability to the treatment of cooked, cured comminuted meat products of the sausage type, such as frankfurters, Bologna, meat loaves, etc.

In the practice of the present invention various ferrous compounds can be employed. The principal requisite is that they are capable of providing ferrous ions in the meat. Also, they should be non-toxic for obvious reasons. Examples of some ferrous compounds which can be used in the practice of this invention include ferrous chloride, ferrous sulphate, ferrous bromide, ferrous iodide, ferrous ammonium sulphate, ferrous lactate, ferrous gluconate, and ferrous citrate.

The quantity of the ferrous compound employed will depend upon several factors, such as its molecular weight and the amount of fat present in the meat. In all events, however, the quantity employed will be sufficient to provide an added concentration of ferrous ion in the meat of from 30 to 300 parts per mililon. It has been our experience that if less than 30 parts per million of ferrous ion are added there is no appreciable improvement in color or lowering of the temperature at which color development takes place. On the other hand, the addition of more than 300 parts per million of ferrous ion actually tends to promote discoloration in the meat. The reason for this is not fully understood, but it is believed that when a high concentration of ferrous ion is added, so much of it is converted to the ferric state that the oxidation of the meat pigments is actually enhanced.

It will be obvious from the above that the molecular weight of the particular ferrous compound being employed will have a direct bearing upon the actual weight of the salt employed. In the case of ferrous sulphate having 7 mols of water of hydration, to provide a ferrous ion concentration of 150 parts per million in 100 pounds of raw material 34.5 gms. or 1¼ ozs. of salt are required. To provide an added concentration of 100 parts per million 23.0 gms. or ⅝ ounce are required; and for 50 parts per million 11.5 gms. or 5/12 ounce are required. The actual weight of salt to be used can be easily calculated when the chemical formula for the ferrous compound is known.

Another factor to be considered in determining the quantity of ferrous compound to be used is the fat content of the meat being treated. Generally, a lean meat requires a lesser concentration of ferrous ion whereas a fatter meat requires a higher concentration of ferrous ion. In meat having less than about 20% by weight of fat, from about 40 to about 75 parts per million of ferrous ion, preferably about 50 parts per million, is desirable. In meat having more than about 20% fat, from about 75 to 150 parts per million of ferrous ion, preferably about 100 parts per million, is most effective.

As pointed out hereinabove, the preferred modification of this invention is its application in the preparation of cooked cured comminuted meat products, such as the sausage type. In the conventional method for the preparation of a sausage, as for example Bologna, the meat is comminuted and then blended, generally pork and beef, and spices are added followed by the conventional curing ingredients. After all the ingredients are thoroughly mixed, the meat is then put into either casings, into molds, or into cans or jars, after which it is heated to develop a uniform red color. When the meat is packed in casings the heating is generally accomplished in a smokehouse. When packed in molds or cans or jars, the heating is generally accomplished by water cooking. As mentioned earlier herein, the red color does not begin to develop until 130° F. is reached and it is usually necessary to exceed the 137° F. required by government regulations to actually bring out a uniform color development. Generally, the meat is heated to about 155 to 160° F. to insure development of the uniform color.

We have discovered that if from 30 to 300 parts per million of ferrous ion are added to the meat at any stage prior to the heating step a red color begins to develop at about 110° F., and at 125° F. there is a fully developed uniform red color throughout the meat. Thus, it is no longer necessary to heat the meat to exceedingly high temperatures to bring about the development of color. All that is required is that the meat be brought to an internal temperature of 137° F. to comply with government regulations. By virtue of this lower temperature, there is less adverse effect on the protein material in the meat which results in less shrinkage and also greater stability of color. Further, by virtue of this lower temperature, less heat and a shorter processing time is required, thus effecting a considerable saving in the cost of the production of the sausage.

As mentioned before, the ferrous ion can be added to the meat during the comminuting step, or during the blending step, or with the spices, or after the addition of the curing ingredients but prior to the heating step.

When meat processed in accordance with our invention is subsequently vacuum packaged, there is a very noticeable increase in the stability of the red color.

It is also possible, according to our invention, to achieve an improved surface color in packaged meat by spraying the exposed layers with a solution of a ferrous salt so as to provide an added concentration of ferrous ions preferably from 30 to 300 parts per million. If this is done shortly prior to the packaging operation there is a noticeable improvement both in the color and its stability.

The following examples are intended to illustrate our invention in several of its aspects and are not to be construed as limiting thereof:

*Example 1*

Two twenty-five pound batches of Bologna emulsion with a fat content of approximately 25% were prepared in an identical manner following standard practices and using conventional curing compositions except that 8.65 grams of ferrous sulfate heptahydrate ($FeSO_4 \cdot 7H_2O$), or about 150 parts per million of ferrous ion, were added as a concentrated water solution to the treated sample one minute before removal of the emulsion from the rotary cutter. Both lots were then vacuumized, stuffed and heated and smoked according to standard procedures which require that an internal sausage temperature of at least 137° F. be reached in any product containing pork. After proper cooling the two lots were sliced and vacuum packaged. After a holding period of 1–7 days, samples of the two lots were exposed to fluorescent lights at an illumination of approximately 25 f. c. The control product discolored to tan-brown within 5 hours while the product containing the ferrous sulfate remained red even after 24 hours of exposure.

*Example 2*

Two twenty-five pound batches of standard Bologna emulsion with a fat content below 20% were prepared in an identical manner following standard practices and using conventional curing compositions except that to the treated sample were added 2.86 grams of ferrous sulfate heptahydrate, or about 50 parts per million or ferrous ion. The two lots were then handled as described under Example 1. After the 1–7 day holding period, samples of the two lots were exposed to fluorescent lights. The control sample discolored to tan-brown after 5 hours while the sample containing the ferrous sulfate maintained good red color even after 24 hours' exposure to lights.

*Example 3*

Two twenty-five pound batches of Bologna emulsion with a fat content of approximately 25% were prepared in an identical manner following standard practices and using conventional curing compositions except that the dry spice mixture added to the test lot contained 8.65 grams of ferrous sulfate heptahydrate, or about 150 parts per million of ferrous ion. The lots were handled as under Example 1. Following the 1–7 day holding period samples of the two lots were exposed to lights. The control sample faded to tan-brown in 5 hours, while the sample containing the ferrous sulfate maintained a good red color even after 28 hours of light exposure.

*Example 4*

Two twenty-five pound batches of frankfurter emulsions were prepared in an identical manner following standard practice and using conventional curing compositions except that one batch had 5.74 grams of ferrous sulfate heptahydrate, or about 100 parts per million of ferrous ion, added in a water solution just prior to removal from the rotary cutter. The emulsion was vacuumized and stuffed into Visking casings. Each batch was subdivided into 6 lots. These were heated in a smokehouse maintained at 160° F. until a specified internal temperature in the frankfurters was attained. One test lot and one control lot were removed at each of the following sausage internal temperatures: 110° F., 120° F., 125° F., 130° F., 135° F., and 145° F.

Following the heating and smoking described in the previous statement all lots were heated in a Jourdan Cooker to an internal end temperature of 152° F. The product was examined for color development both after removal from the smokehouse and after removal from the Jourdan Cooker. The lot containing ferrous sulfate which had been heated to 110° F. internal temperature in the smokehouse showed a slight color development in the interior. This color development was uniform and complete at 125° F. internal temperature in the lots containing ferrous sulfate. The control lots showed no internal color development until an internal temperature of 130° F. had been reached. Complete and uniform color development in the control sample took place at some point between 135–145° F.

The examination of internal color after processing in the Jourdan Cooker showed uniform color development in all lots of frankfurters which contained ferrous sulfate regardless of the end internal temperature which they had attained in the smokehouse. In the case of the control samples, only those which had been heated to an internal temperature of 135° F. and above showed full and uniform color development after processing in the Jourdan Cooker. This uniform internal color developed in all of the lots containing ferrous sulfate was stable even after 2 weeks of storage. Since the color development took place at a lower temperature in the product containing ferrous sulfate, the time required for heating in the smokehouse to produce a uniform color was reduced from 200 minutes for the control to 120 minutes for the sample containing ferrous sulfate.

*Example 5*

Two twenty-five pound batches of Bologna fat content less than 20% fat were prepared in an identical fashion following standard practices and using conventional curing compositions except that one batch had added to it 2.05 grams of ferrous chloride ($FeCl_2 \cdot 4H_2O$), or about 50 parts per million of ferrous ion, as a water solution just prior to the completion of the chopping operation. The batches were handled as described under Example 1. After packaging under vacuum the two lots were held 1–7 days in the cooler, then exposed to fluorescent lights in a cabinet maintained at 40–42° F. The control sample had discolored to tan-brown after 5 hours whereas the sample containing ferrous chloride maintained a good red color even at 28 hours of exposure to lights.

*Example 6*

Two twenty-five pound batches of Bologna, fat content approximately 25% were prepared in an identical manner following standard practices and using conventional curing compositions, except that to one batch 6.15 grams of ferrous chloride ($FeCl_2 \cdot 4H_2O$), or about 150 parts per million of ferrous ion, were added as a water solution just prior to the termination of the chopping operation. The two batches were processed as described under Example 1, vacuum packaged and held for 1–7 days. At the end of this time samples of the two lots were exposed to fluorescent lights in a display case maintained at 40–42° F. The control samples discolored to tan-brown after 5 hours while the samples containing ferrous chloride had a good red color even after 28 hours of exposure to lights.

While this invention has been described and exemplified in terms of its preferred modifications, those skilled in the art will readily appreciate that many changes can be made without departing from the spirit of the invention.

We claim:

1. In a process for improving the color of a meat product containing a ferriprotoporphyrin pigment material, the improvement comprising subjecting said product to contact with a ferrous salt to provide an added ferrous ion concentration in said meat of from 30 to 300 parts per millon.

2. In a process for improving the color of a meat product containing a ferriprotoporphyrin pigment material, the improvement comprising subjecting said product to contact with ferrous sulphate to provide an added ferrous ion concentration in said meat of from 30 to 300 parts per million.

3. In a process for improving the color of a meat product containing a ferriprotoporpyhrin pigment material, the improvement comprising subjecting said product to contact with ferrous chloride to provide an added ferrous ion concentration in said meat of from 30 to 300 parts per million.

4. In a process for improving the color of a meat product containing a ferriprotoporphyrin pigment material, the improvement comprising subjecting said product to contact with ferrous ammonium sulphate to provide an added ferrous ion concentration in said meat of from 30 to 300 parts per million.

5. In a process for improving the color of a meat product containing a ferriprotoporphyrin pigment material, the improvement comprising subjecting said product to contact with ferrous lactate to provide an added ferrous ion concentration in said meat of from 30 to 300 parts per million.

6. In a process for improving the color of a meat product containing a ferriprotoporphyrin pigment material, the improvement comprising subjecting said product to contact with ferrous gluconate to provide an added ferrous ion concentration in said meat of from 30 to 300 parts per million.

7. In a process for preparing cooked comminuted cured meat products, the improvement which comprises speeding the development of improved color by subjecting the meat material prior to cooking to contact with a ferrous salt to increase the ferrous ion concentration thereof from 30 to 300 parts per million.

8. A process for stabilizing the color of a vacuum-packaged cooked cured meat product which comprises contacting said meat product prior to packaging with a ferrous salt to provide an added ferrous ion concentration therein in the range of 30 to 300 parts per million.

9. A process for improving and stabilizing the surface color of a packaged meat product which comprises coating the exposed surfaces of the meat prior to packaging with a solution of a ferrous compound to provide a ferrous ion concentration between about 30 and 300 parts per million.

References Cited in the file of this patent

UNITED STATES PATENTS 832,180     Calm ------------------ Oct. 2, 1906

OTHER REFERENCES

"Food Research," January-February 1953, pages 11 to 16, inclusive, article entitled "Effect of Metal Ions on the Formation of Nitric Oxide Hemoglobin," by T. J. Weiss et al.